July 20, 1965   P. S. DUBROFF ETAL   3,196,391
DYNAMICALLY CHECKING BINARY ENCODERS
Filed July 12, 1961   2 Sheets-Sheet 1

PAUL S. DUBROFF
JIN W. CHIN
INVENTORS

BY S. A. Giarratana
George B. Ayevlk

ATTORNEYS

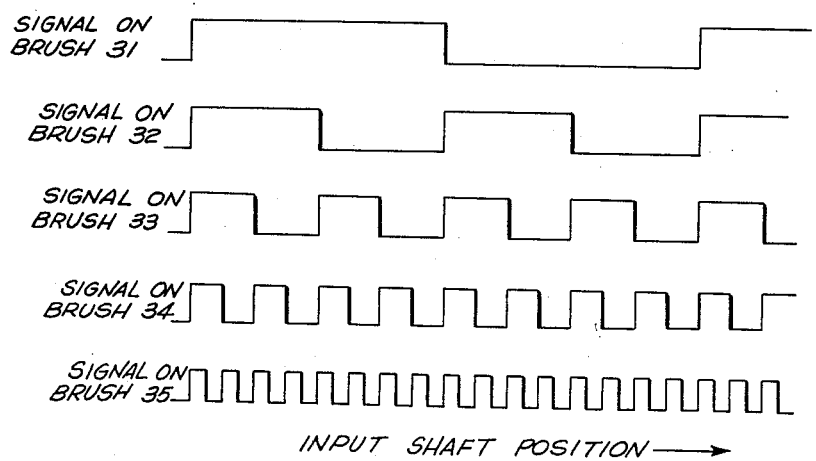
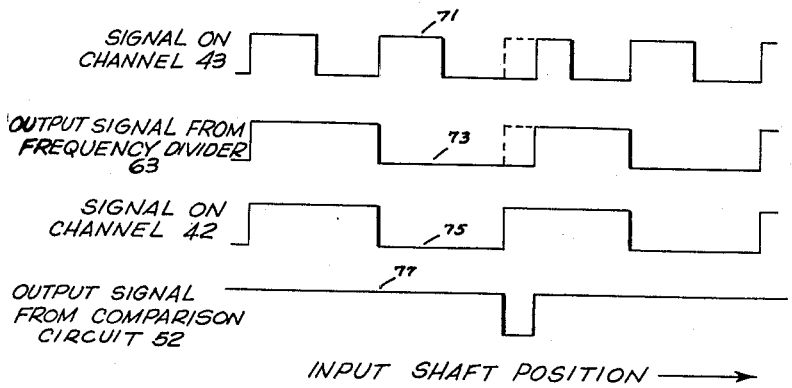

United States Patent Office 3,196,391
Patented July 20, 1965

3,196,391
DYNAMICALLY CHECKING BINARY ENCODERS
Paul S. Dubroff, Englewood, and Jin W. Chin, Morristown, N.J., assignors to General Precision Inc., Little Falls, N.J., a corporation of Delaware
Filed July 12, 1961, Ser. No. 123,545
3 Claims. (Cl. 340—146.1)

This invention relates to checking encoders, and more particularly to a system for dynamically checking the output of a shaft-to-binary encoder.

Shaft-to-binary encoders are used to provide an indication in digital form of the angular position of a shaft. It is desirable to be able to check the operation of such an encoder dynamically, or in other words continuously while the input shaft of the encoder is being rotated. For example, shaft-to-binary encoders are often used as part of an analog-to-digital converter. Means such as a servomotor are provided to drive the input shaft of the encoder to an angular position proportional to the input signal. The output of the encoder will then represent the analog input signal in binary form. When such an alalog-to-digital converter is statically tested, known analog signals are fed to the input of the analog-to-digital converter, and the digital output from the shaft-to-binary encoder is compared with the known input signal. It is desirable also to test the functioning of the shaft-to-binary encoder dynamically while it is being driven from one position to another in the static testing of the converter. The system of the present invention performs this dynamic testing function.

The system of the present invention makes use of the fact that the digital output from a shaft-to-binary encoder changes incrementally as the input shaft of the encoder is rotated. This means that the output signal representing digits of any given order of significance of the binary output will change back and forth from 1 to 0 at a frequency which is twice that of the output signal representing the digits of the next highest order of significance when the input shaft to the encoder is rotated. In the system of the present invention the output signals representing digits of all orders of significance in the binary output except the highest order of significance are fed to frequency dividers. The coincidence of the output signal from each frequency divider is then compared with the output signal of the encoder representing digits of the next highest order of significance after that of the digits represented by the signal which is fed to the input of such frequency divider. The output from each frequency divider should coincide with the output with which it is compared, and the comparisons will indicate any non-coincidence and thus will indicate whether or not the encoder is operating properly.

In the most common type of shaft-to-binary encoders the shaft drives a commutator in the form of a disc or drum, which has a plurality of tracks. Brushes severally ride on and engage the commutator tracks, which contain conducting and non-conducting segments. The dynamic checking of such an encoder in accordance with the invention will detect errors caused by brush skip or bounce, worn or destroyed commutator segments, misalignment of brushes or commutator segments, and improper coding of the commutator. The system will also detect equivalent types of errors in optical or magnetic shaft-to-binary encoders. In general the system can be used to detect errors in any kind of binary encoder which may be driven so that the binary output therefrom changes incrementally.

Accordingly, a principal object of this invention is to dynamically check binary encoders.

Another object of this invention is to provide an improved system for dynamically checking binary encoders.

A still further object of this invention is to check binary encoders for errors caused by brush skip or bounce.

A still further object of this invention is to dynamically check for erased, destroyed or worn commutator segments, misalignment of the commutator segments and the commuatator pickups, and improper coding of the commutator.

Further objects and advantages of the present invention will become readily apparent as the following detailed description of a preferred embodiment of the invention unfolds and when taken in conjunction with the drawings, wherein:

FIG. 3 shows a family of waveforms produced by the encoder shown in FIGS. 1 and 2;

FIG. 5 shows an example of a family of waveforms produced when an error occurs in the encoder output.

Figure 2:
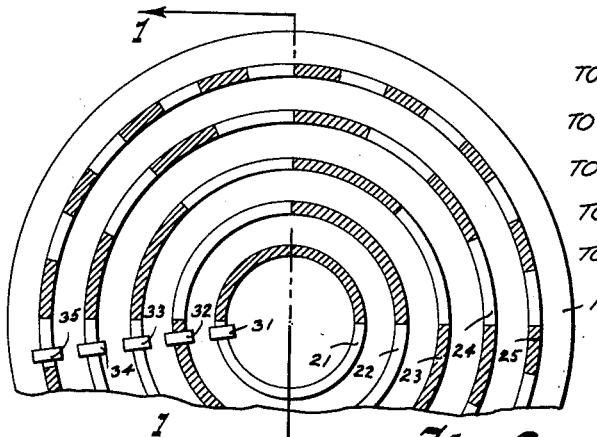
FIG. 2 illustrates a view of the face of the commutator disc of the encoder shown in FIG. 1.
Figure 1:
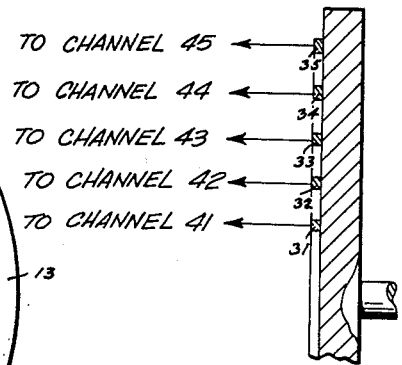
FIG. 1 illustrates an example of a shaft-to-binary encoder such as is checked by the system of the invention.

As shown in FIGS. 1 and 2, the exemplary shaft-to-binary encoder, which can be checked by the system of the invention, comprises the shaft 11 which drives the disc 13. On the face of the disc are five concentric tracks 21 through 25, which are engaged by radially positioned brushes 31 through 35 respectively. The tracks 21 through 25 each comprise alternating conducting and insulating segments which the brushes 31 through 35 contact as the disc is rotated. The track 21 comprises a conducting segment occupying 180° and a non-conducting segment occupying 180°. The brush 31 engaging this track produces the output signal representing digits of the highest order of significance. The track 22 comprises two conducting segments occupying 90° separated by two non-conducting segments occupying 90°. The brush 32 engaging the track 22 produces the output signal representing digits of the next highest order of significance. The track 23 comprises four regularly spaced conducting segments occupying 45° separated by four non-conducting segments occupying 45°. The track 24 comprises eight conducting segments interspersed with eight non-conducting segments each occupying 22.5° and the track 25 comprises sixteen conducting segments separated by sixteen non-conducting segments each occupying 11.25°. The brushes 33 through 35 engaging the tracks 23 through 25 respectively produce output signals representing digits in the binary output of the remaining orders of significance, with the order of significance decreasing from brush 33 to brush 35.

If the conducting segments on the disc 13 are each connected to a source of positive voltage and the brushes 31 through 35 are each connected to ground through a resistor, then the voltages produced by the brushes will be a binary indication of the angular position of the shaft 11 with a positive voltage on any one brush indicating one binary digit and a zero voltage on any one brush indicating the opposite binary digit. With such an arrangement the waveforms shown in FIG. 3 will be produced by the brushes 31 through 35 respectively as the disc 13 is rotated continuously in one direction. The waveforms are shown in FIG. 3 as amplitudes each on individual vertical coordinates versus the angular position of the input shaft to the encoder on common horizontal coordinates. The conductive and non-conductive segments of the tracks 21 through 25 and the brushes 31 through 35 are aligned so that the waveforms of the output signals produced on brushes 31 through 35 are synchronized as shown in FIG. 3. As shown in this figure, the output signals are square waves and the frequency of each output signal is twice that of the output signal representing digits of the next highest order of significance. Thus the output signal from the brush 32 is twice the frequency of the output signal from the brush 31, and the output signal from the brush 33 is twice the frequency of the output signal from the brush 32.

Figure 4:
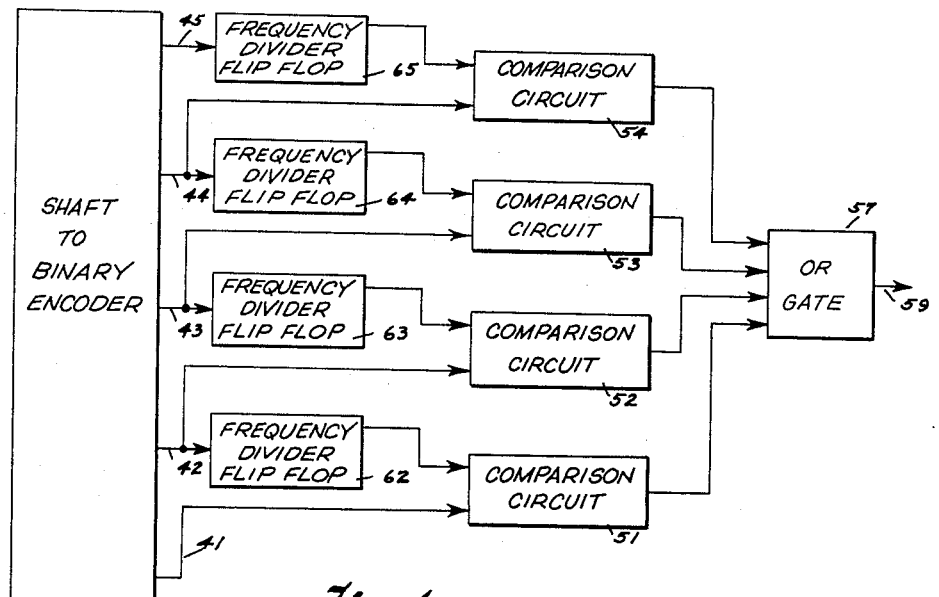
FIG. 4 is a block diagram of the apparatus of the invention.

The apparatus of the invention for dynamically checking the output of a binary encoder such as that shown in FIGS. 1 and 2 comprises a plurality of input channels equal in number to the orders of significance in the binary output of the encoder to be checked. The system of the invention shown in FIG. 4 comprises five input channels 41 through 45 and thus is adapted to dynamically check the binary encoder shown in FIGS. 1 and 2, which produces a binary output with five orders of significance on the five brushes 31 through 35. To dynamically check the binary encoder shown in FIGS. 1 and 2, the channels 41 through 45 are connected to the brushes 31 through 35 respectively so that the signals representing the binary output of the encoder shown in FIGS. 1 and 2 are produced on channels 41 through 45 with the order of significance decreasing from channel 41 to channel 45. The signals on channels 42 through 45 are applied to frequency dividers 62 through 65, respectively. The frequency dividers 62 through 65 each comprise a flip-flop which is designed to switch to its opposite state in response to the positive going vertical portion of an applied square wave. Each of the flip-flops will therefore produce a square wave output signal having a frequency which is one half the frequency of the applied square wave input. Thus the flip-flops comprise frequency dividers which divide the input frequency by two. In the dynamic checking of the binary encoder, it is driven so that it changes its binary output incrementally to produce waveforms as shown in FIG. 3 and the output signal of the encoder representing digits of any given order of significance will be twice the frequency of the output signal representing digits of the next highest order of significance. If the binary encoder is functioning properly when it is driven in this manner, the frequency of the output signal from the frequency divider 65 will be equal to the frequency of the signal on channel 44, the frequency of the output signal from the frequency divider 64 will be equal to the frequency of the signal on channel 43, the frequency of the output signal from the frequency divider 63 will be equal to the frequency of the signal on channel 42, and the frequency of the output signal from the frequency divider 62 will be equal to the frequency of the signal on channel 41. The output signals from the frequency dividers 62 through 65 can either coincide precisely in phase with the signals on the channels 41 through 44 respectively, or then can be 180° out of phase with these signals depending upon the initial states of the flip-flops in the frequency dividers. The flip-flops of each of the frequency dividers 62 through 65 are preset so that the output signals therefrom will be in phase with the output signals on the channels 41 through 44 respectively. Thus if the binary encoder is functioning properly when it is driven to change its output incrementally, the output signals from the frequency dividers 62 through 65 will coincide precisely with the output signals on channels 41 through 44 respectively. The output signals from the frequency dividers 62 through 65 are applied to comparison circuits 51 through 54 respectively. The signals on the channels 41 through 44 are also applied to the comparison circuits 51 through 54 respectively, so that the output signal from each one of the frequency dividers 62 through 65 is compared with the signal representing digits of the next highest order of significance after that of the digits represented by the signal on the channel applied to such frequency divider. Thus the output from each of the frequency dividers 62 through 65 is compared with the output on the channel with which it should coincide if the binary encoder is functioning properly. The comparison circuits 51 through 54 will each produce an output pulse whenever the signals applied thereto from the respective channel and frequency divider do not coincide. The comparison circuits 51 through 54 thus each comprise a means to compare the coincidence of the two applied input signals and indicate any non-coincidence thereof. The inputs to the comparison circuits 51 through 54 will coincide unless some error occurs in the binary output from the encoder. The outputs from the comparison circuits 51 through 54 are applied to an OR gate 57 where the outputs are combined and produced on a single output channel 59. Thus a pulse will be produced on the output channel 59 whenever an error occurs in the binary output from the encoder as it is rotated continuously from one position to another.

For example, if one of the conductive commutator segments is partially worn away in track 23, the output signal from the frequency divider 63 will not coincide with the signal on channel 42 and the comparison circuit 52 will produce an output pulse when the non-coincidence occurs, which output pulse will pass through the OR gate 57 to the output channel 59. FIG. 5 shows a family of waveforms that result when such an error occurs in the output from the binary encoder. These waveforms are shown in FIG. 5 with individual amplitude coordinates versus common coordinates representing shaft position. When the error occurs a signal having a waveform such as that designated by the reference number 71 will result on channel 43. As shown in FIG. 5, the waveform 71 is not symmetrical and has a positive portion which is not as wide as it should be. The correct shape of the waveform 71 is indicated in phantom at the point in the waveform where the error occurs. The waveform 73 in FIG. 5 is the output from the frequency divider 63 that will result when the waveform 71 is produced on channel 43. As shown in FIG. 5, one of the positive portions of the square waveform 73 is narrowed. The correct shape of the waveform 73, when a normal waveform is applied to the frequency divider 63 from channel 43, is shown in phantom where the error occurs. The waveform 75 in FIG. 5 is the normal output signal on channel 42, which is compared in the comparison circuit 52 with the waveform 73 from the frequency divider 63. As will be apparent from FIG. 5, the waveforms 73 and 75 do not coincide and as a result the comparison circuit 52 will produce an output pulse when the non-coincidence occurs. The waveform of the resulting output signal from the comparison circuit 52 is designated by the reference number 77. The pulse in the waveform 77 will pass through the OR gate 57 to the output channel 59, thus providing an indication of the error. In a similar manner errors due to brush bounce or skip, or to one of the insulating sections being filled in or partially filled in with conducting material, or to the disc 13 being improperly coded in the first place will produce an output pulse on the output channel 59 indicating the error when the shaft-to-binary encoder is dynamically checked by the system.

The system, in addition to checking errors in this specific type of shaft-to-binary encoder making use of brushes and conducting and insulating segments on a disc, will also check equivalent errors dynamically on other types of binary encoders. For example, the system will work equally well on an encoder in which the commutator, instead of being in the form of a disc, is a drum. Also the encoding may be done optically with photoelectric cells as pickups instead of using conducting and non-conducting segments with brushes as pickups. The system can be used on any binary encoder which can be driven to produce its binary output incrementally.

Although the system has been described for checking a five channel output shaft-to-binary encoder, it will be apparent that the system may be easily expanded to cover encoders with any number of output signals. The above description is of a specific embodiment of the invention, and many modifications may be made thereto without departing from the spirit and scope of the invention.

What is claimed is:
1. Apparatus for dynamically checking a binary encoder including means for driving said encoder to pro- duce its output incrementally, means for dividing the frequency of the output signal of said binary encoder representing binary digits of one order of significance by two, and means for generating an output indication whenever the signal with the divided frequency does not coincide with the output signal of said encoder representing binary digits of the next higher order of significance.

2. Apparatus for dynamically checking a binary encoder including means for driving said encoder to produce its output incrementally, means for dividing the frequency of the output signal of said binary encoder representing binary digits of one order of significance, and means for generating an output indication whenever the signal with the divided frequency does not coincide with the output signal of said encoder representing binary digits of a higher order of significance.

3. Apparatus for dynamically checking a binary encoder including means for driving said encoder to produce its output incrementally, means for dividing by two the frequency of each of the output signals of said encoder representing the binary digits of all orders of significance except the highest order of significance to thereby produce a plurality of second signals, and means for generating an output indication whenever one of said second signals does not coincide with the output signal of said binary encoder representing digits of the next higher order of significance after that of the digits represented by the signal from which such second signal is produced.

References Cited by the Examiner
UNITED STATES PATENTS

| | | | |
|---|---|---|---|
| 2,521,789 | 9/50 | Grossdoff | 328—134 X |
| 2,793,807 | 5/57 | Yaeger | 235—154 |
| 2,907,996 | 10/59 | Schmidt | 340—347.3 |

ROBERT C. BAILEY, *Primary Examiner.*

MALCOLM A. MORRISON, *Examiner.*